(12) United States Patent
Zhang

(10) Patent No.: US 10,073,233 B2
(45) Date of Patent: *Sep. 11, 2018

(54) FIBER OPTIC MODULE AND CHASSIS

(71) Applicant: ADC Telecommunications (Shanghai) Distribution Co. Ltd., Shanghai (CN)

(72) Inventor: Yuanzhe Zhang, Shanghai (CN)

(73) Assignee: ADC Telecommunications (Shanghai) Distribution Co. Ltd., Shanghai (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/483,293

(22) Filed: Apr. 10, 2017

(65) Prior Publication Data

US 2017/0336588 A1 Nov. 23, 2017

Related U.S. Application Data

(63) Continuation of application No. 14/995,374, filed on Jan. 14, 2016, now Pat. No. 9,618,719, which is a continuation of application No. 13/643,697, filed as application No. PCT/CN2010/072247 on Apr. 27, 2010, now Pat. No. 9,239,442.

(51) Int. Cl.
*G02B 6/00* (2006.01)
*G02B 6/44* (2006.01)
*H04Q 1/06* (2006.01)
*H04Q 1/02* (2006.01)
*H04Q 1/10* (2006.01)

(52) U.S. Cl.
CPC ......... *G02B 6/4455* (2013.01); *G02B 6/4452* (2013.01); *G02B 6/4453* (2013.01); *G02B 6/4471* (2013.01); *H04Q 1/023* (2013.01); *H04Q 1/06* (2013.01); *H04Q 1/10* (2013.01)

(58) Field of Classification Search
CPC .. G02B 6/4452; G02B 6/4453; G02B 6/4455; G02B 6/4471
USPC .................................................. 385/134–136
See application file for complete search history.

(56) References Cited

U.S. PATENT DOCUMENTS

| | | |
|---|---|---|
| 4,650,933 A | 3/1987 | Benda et al. |
| 4,768,961 A | 9/1988 | Lau |
| 4,770,639 A | 9/1988 | Lau |
| 4,797,114 A | 1/1989 | Lau |
| 4,820,200 A | 4/1989 | Lau |
| 4,840,568 A | 6/1989 | Burroughs et al. |
| 5,189,410 A | 2/1993 | Kosugi et al. |
| 5,199,878 A | 4/1993 | Dewey et al. |
| 5,214,673 A | 5/1993 | Morgenstern et al. |

(Continued)

FOREIGN PATENT DOCUMENTS

| | | |
|---|---|---|
| CN | 1656405 | 8/2005 |
| CN | 101384938 | 3/2009 |

(Continued)

OTHER PUBLICATIONS

International Search report for International Application No. PCT/CN2010/072247 dated Oct. 21, 2010.

(Continued)

*Primary Examiner* — Robert Tavlykaev
(74) *Attorney, Agent, or Firm* — Merchant & Gould P.C.

(57) ABSTRACT

A telecommunications assembly includes a chassis and a plurality of modules removably mounted within the chassis. The modules include one or more fiber optic signal input locations. The modules include optical equipment for splitting the input signals into customer output signals.

15 Claims, 16 Drawing Sheets

(56) References Cited

U.S. PATENT DOCUMENTS

| | | |
|---|---|---|
| 5,274,978 A | 1/1994 | Perkonigg et al. |
| 5,317,663 A | 5/1994 | Beard et al. |
| 5,339,379 A | 8/1994 | Kutsch et al. |
| 5,363,465 A | 11/1994 | Korkowski et al. |
| 5,393,249 A | 2/1995 | Morgenstern et al. |
| 5,432,875 A | 7/1995 | Korkowski et al. |
| 5,467,062 A | 11/1995 | Burroughs |
| 5,497,444 A | 3/1996 | Wheeler |
| 5,582,525 A | 12/1996 | Louwagie et al. |
| 5,613,030 A | 3/1997 | Hoffer et al. |
| 5,627,925 A | 5/1997 | Alferness et al. |
| 5,685,741 A | 11/1997 | Dewey et al. |
| 5,694,511 A | 12/1997 | Pimpinella et al. |
| 5,701,380 A | 12/1997 | Larson et al. |
| 5,717,810 A | 2/1998 | Wheeler |
| 5,946,440 A | 8/1999 | Puetz |
| 6,078,718 A | 6/2000 | Merriken et al. |
| 6,116,961 A | 9/2000 | Henneberger et al. |
| 6,208,796 B1 | 3/2001 | Vigliaturo |
| 6,226,111 B1 | 5/2001 | Chang et al. |
| 6,263,136 B1 | 7/2001 | Jennings et al. |
| 6,307,998 B2 | 10/2001 | Vigliaturo |
| 6,328,608 B1 | 12/2001 | Olson et al. |
| 6,363,183 B1 | 3/2002 | Koh |
| 6,370,294 B1 | 4/2002 | Pfeiffer et al. |
| 6,418,262 B1 | 7/2002 | Puetz et al. |
| 6,424,781 B1 | 7/2002 | Puetz et al. |
| 6,511,330 B1 | 1/2003 | Norris |
| 6,532,332 B2 | 3/2003 | Solheid et al. |
| 6,535,682 B1 | 3/2003 | Puetz et al. |
| 6,554,652 B1 | 4/2003 | Musolf et al. |
| 6,556,738 B2 | 4/2003 | Pfeiffer et al. |
| 6,556,763 B1 | 4/2003 | Puetz et al. |
| 6,579,014 B2 | 6/2003 | Melton et al. |
| 6,591,051 B2 | 7/2003 | Solheid et al. |
| 6,599,024 B2 | 7/2003 | Zimmel |
| 6,614,953 B2 | 9/2003 | Strasser et al. |
| 6,616,459 B2 | 9/2003 | Norris |
| 6,632,106 B2 | 10/2003 | Musolf et al. |
| RE38,311 E | 11/2003 | Wheeler |
| 6,647,197 B1 | 11/2003 | Marrs et al. |
| 6,668,108 B1 | 12/2003 | Helkey et al. |
| 6,688,780 B2 | 2/2004 | Duran |
| 6,711,339 B2 | 3/2004 | Puetz et al. |
| 6,719,382 B2 | 4/2004 | Sucharczuk et al. |
| 6,760,531 B1 | 7/2004 | Solheid et al. |
| 6,761,594 B2 | 7/2004 | Johnsen et al. |
| 6,810,193 B1 | 10/2004 | Müller |
| 6,822,874 B1 | 11/2004 | Marler |
| 6,824,312 B2 | 11/2004 | McClellan et al. |
| 6,830,465 B2 | 12/2004 | Norris et al. |
| 6,832,035 B1 | 12/2004 | Daoud et al. |
| 6,848,952 B2 | 2/2005 | Norris |
| 6,850,685 B2 | 2/2005 | Tinucci et al. |
| 6,863,446 B2 | 3/2005 | Ngo |
| 6,885,798 B2 | 4/2005 | Zimmel |
| 6,890,187 B2 | 5/2005 | Norris |
| 6,937,807 B2 | 8/2005 | Franklin et al. |
| 6,983,095 B2 | 1/2006 | Reagan et al. |
| 7,029,322 B2 | 4/2006 | Ernst et al. |
| 7,118,284 B2 | 10/2006 | Nakajima et al. |
| 7,142,764 B2 | 11/2006 | Allen et al. |
| 7,177,518 B2 | 2/2007 | Chun |
| 7,190,874 B1 | 3/2007 | Barth et al. |
| 7,194,181 B2 | 3/2007 | Holmberg et al. |
| 7,218,827 B2 | 5/2007 | Vongseng et al. |
| 7,233,731 B2 | 6/2007 | Solheid et al. |
| 7,245,809 B1 | 7/2007 | Gniadek et al. |
| 7,303,220 B2 | 12/2007 | Zellak |
| 7,310,474 B2 | 12/2007 | Kanasaki et al. |
| 7,333,606 B1 | 2/2008 | Swam et al. |
| 7,346,254 B2 | 3/2008 | Kramer et al. |
| 7,362,941 B2 | 4/2008 | Rinderer et al. |
| 7,376,322 B2 | 5/2008 | Zimmel et al. |
| 7,376,323 B2 | 5/2008 | Zimmel |
| 7,400,813 B2 | 7/2008 | Zimmel |
| 7,418,181 B2 | 8/2008 | Zimmel et al. |
| 7,453,706 B2 | 11/2008 | Clark et al. |
| 7,470,068 B2 | 12/2008 | Kahle et al. |
| 7,495,931 B2 | 2/2009 | Clark et al. |
| 7,559,704 B2 | 7/2009 | Togami et al. |
| 7,606,459 B2 | 10/2009 | Zimmel et al. |
| 7,636,507 B2 | 12/2009 | Lu et al. |
| 7,835,611 B2 | 11/2010 | Zimmel |
| 7,853,112 B2 | 12/2010 | Zimmel et al. |
| 7,912,336 B2 | 3/2011 | Zimmel |
| 8,346,045 B2 | 1/2013 | Zimmel et al. |
| 2002/0060629 A1 | 5/2002 | Pfeiffer et al. |
| 2003/0202765 A1 | 10/2003 | Franklin et al. |
| 2005/0105879 A1 | 5/2005 | Kanasaki et al. |
| 2005/0232551 A1 | 10/2005 | Chang et al. |
| 2005/0232565 A1 | 10/2005 | Heggestad et al. |
| 2007/0036503 A1 | 2/2007 | Solheid et al. |
| 2007/0189692 A1 | 8/2007 | Zimmel et al. |
| 2008/0304794 A1 | 12/2008 | Kato et al. |
| 2011/0019964 A1 | 1/2011 | Nhep |

FOREIGN PATENT DOCUMENTS

| | | |
|---|---|---|
| DE | 41 30 706 A1 | 3/1993 |
| DE | 202 01 170 U1 | 5/2002 |
| EP | 0 730 177 A2 | 9/1996 |
| EP | 2 300 978 A | 11/1996 |
| EP | 0 828 356 A2 | 3/1998 |
| EP | 1 092 996 A2 | 4/2001 |
| EP | 1 107 031 A1 | 6/2001 |
| EP | 1 179 745 A2 | 2/2002 |
| EP | 1 473 578 A2 | 11/2004 |
| WO | WO 96/36896 | 11/1996 |
| WO | WO 00/75706 A2 | 12/2000 |
| WO | WO 02/099528 A1 | 12/2002 |
| WO | WO 02/103429 A2 | 12/2002 |
| WO | WO 03/093889 A1 | 11/2003 |
| WO | WO 2006/127397 A1 | 11/2006 |

OTHER PUBLICATIONS

European Search Report for Application No. 10850476.2 dated Oct. 14, 2013.

ADC Telecommunications, Inc., DS3 Digital Signal Cross-Connect (DSX3) System Application Guide, Document No. ADCP-80-323, 1st Edition, Issue 2, Dec. 1996, p. 1-10; p. 1-11.

ADC Telecommunications, Inc., DSX-1 Digital Signal Cross Connect PIX-DSX-1—Fifth Edition, Oct. 1994, 36 Pages.

ADC Telecommunications, Inc., DSX-3 Digital Signal Cross-Connect, Front and Rear Cross-Connect Products, Doc. No. 274, Oct. 2004, 65 pages.

ADC Telecommunications, Inc., OmniReach FTTP Solutions, Doc. No. 1276550, May 2004, 12 pages.

ADC Telecommunications, Inc., PxPlus™ DS1 Digital Signal Cross-Connect, Jan. 1997, 12 Pages.

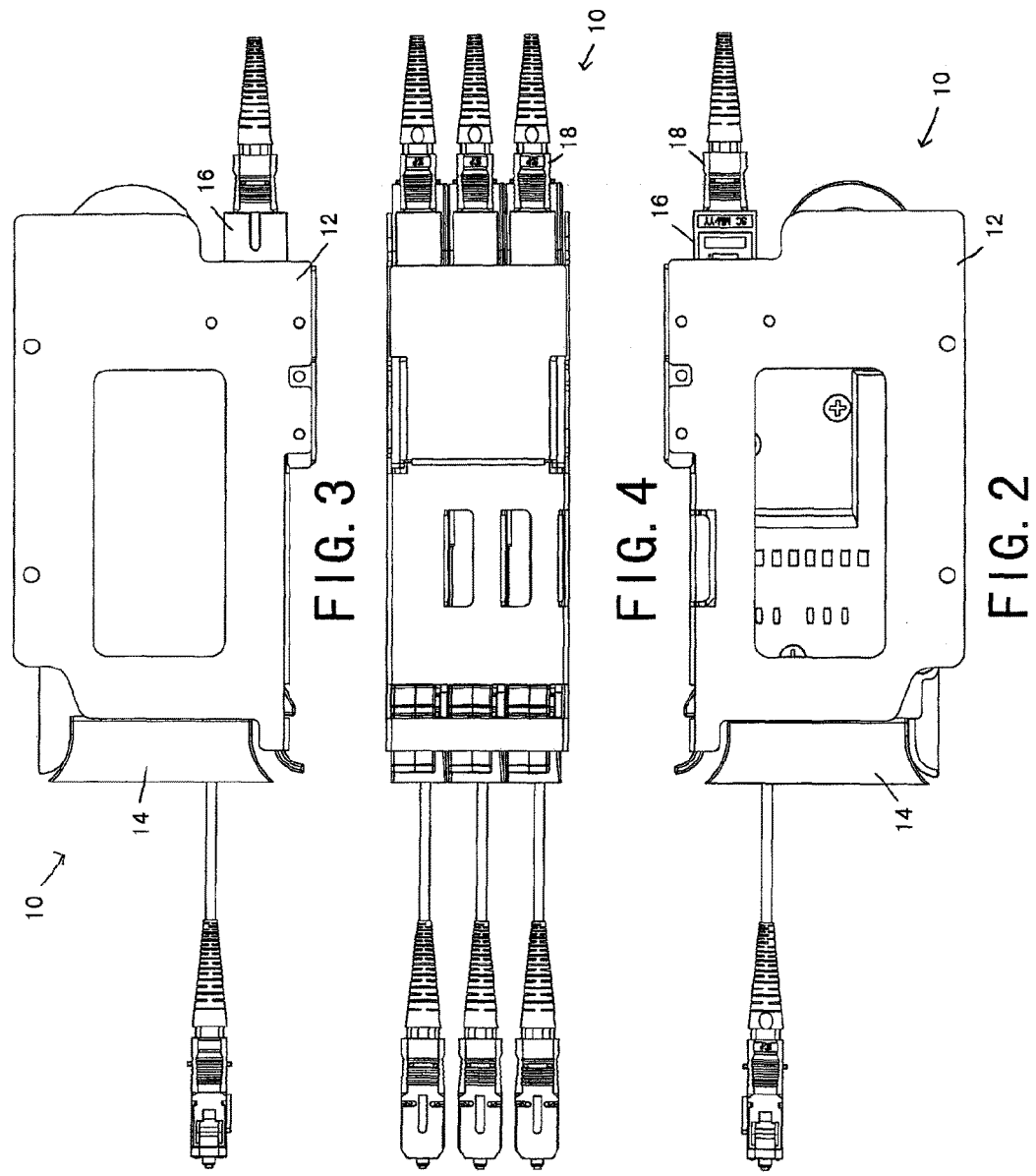

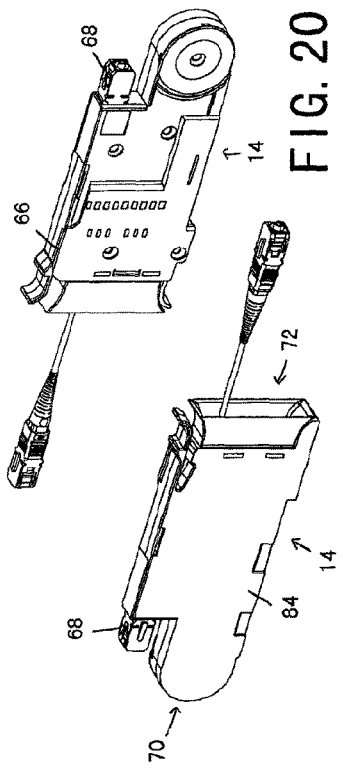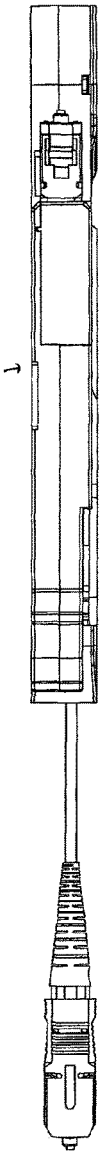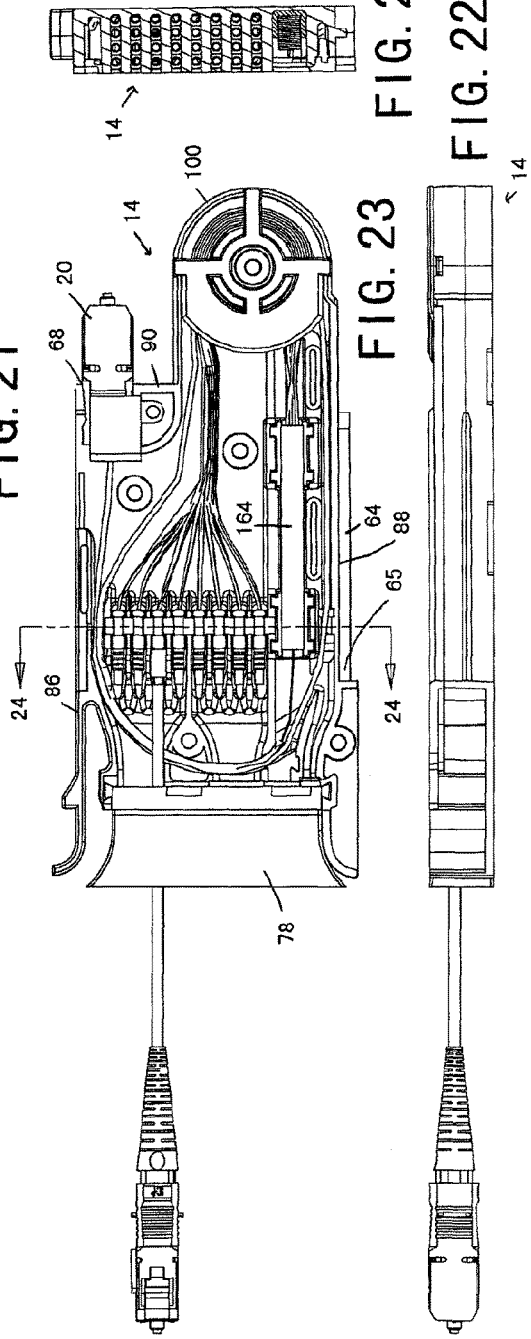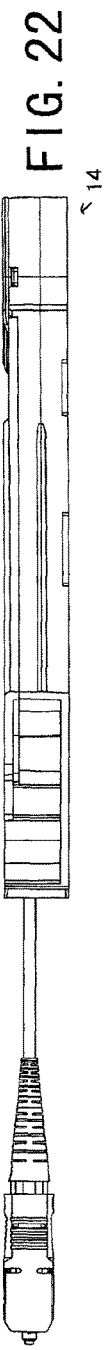

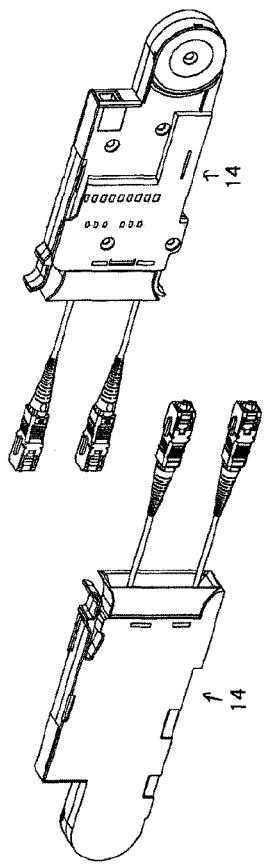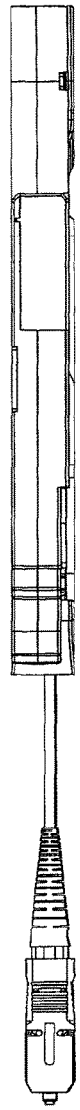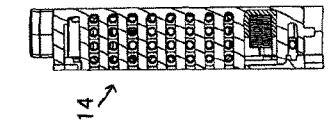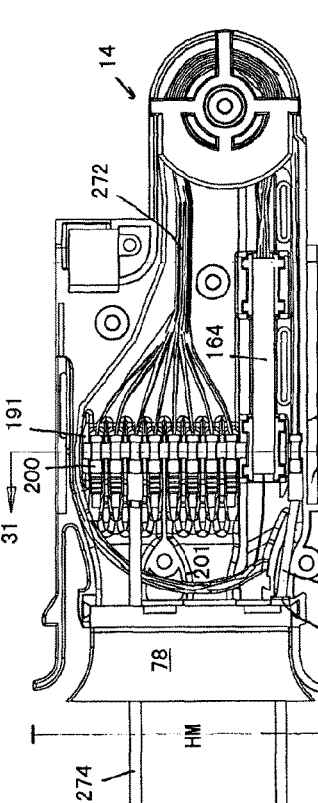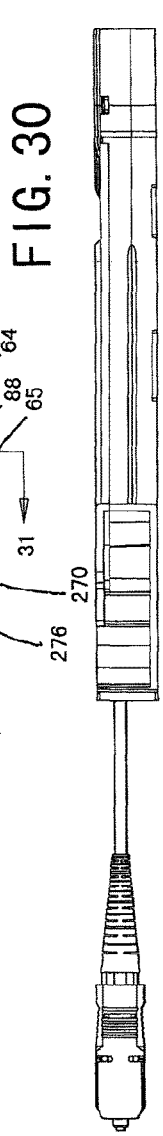

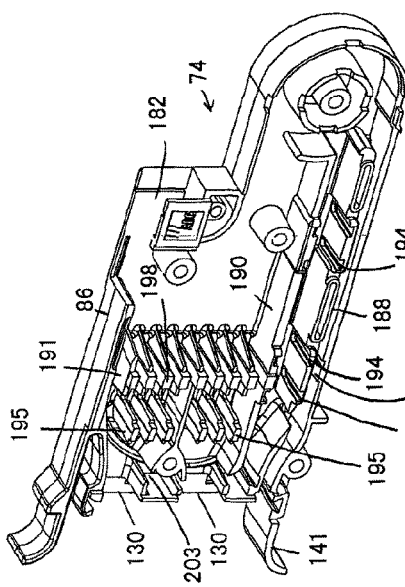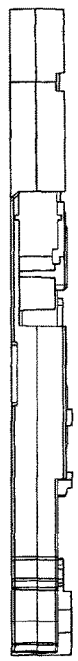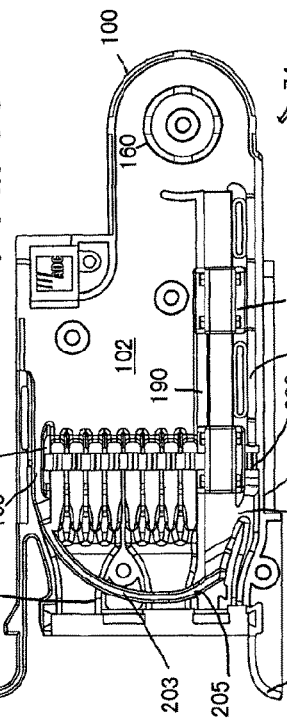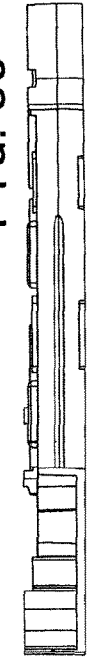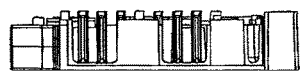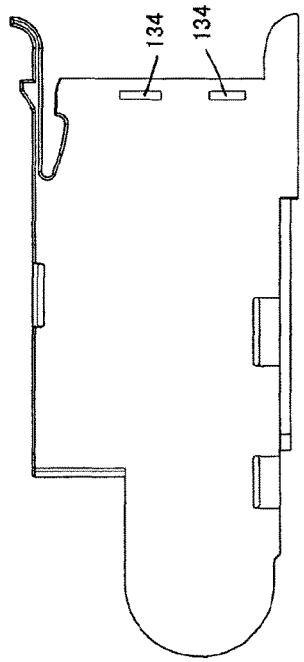

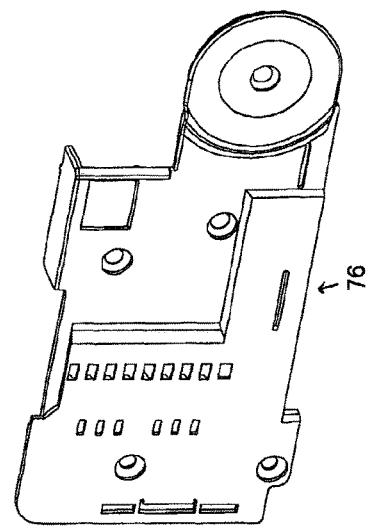
FIG. 41
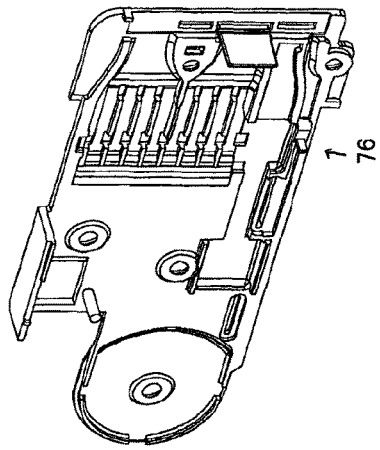
FIG. 40
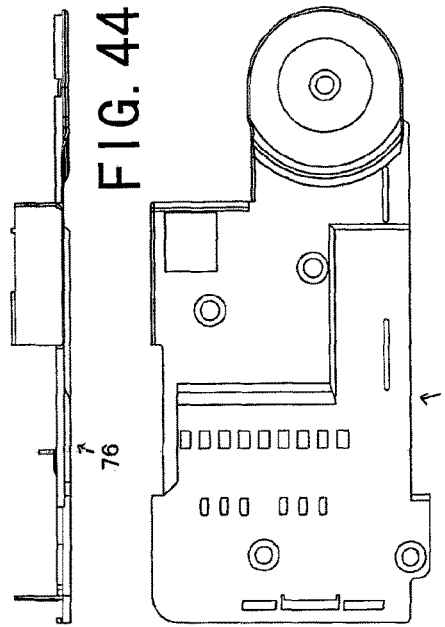
FIG. 44
FIG. 42
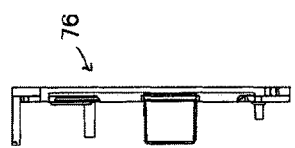
FIG. 45
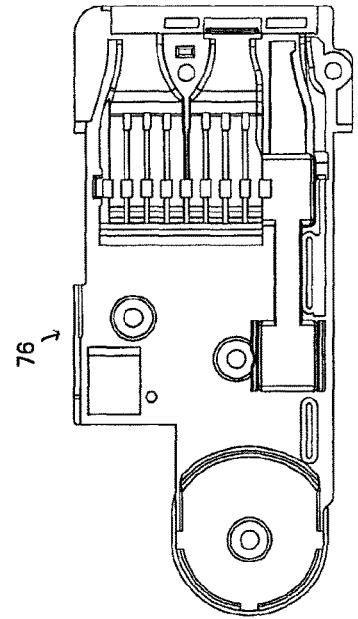
FIG. 43

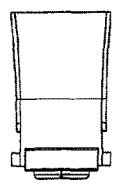
FIG. 56
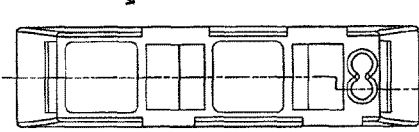
FIG. 52
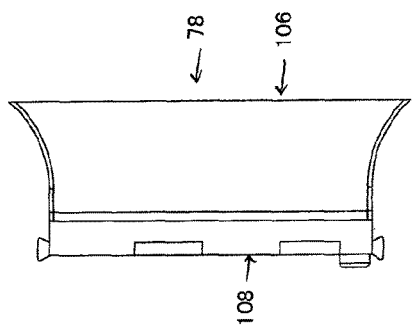
FIG. 54
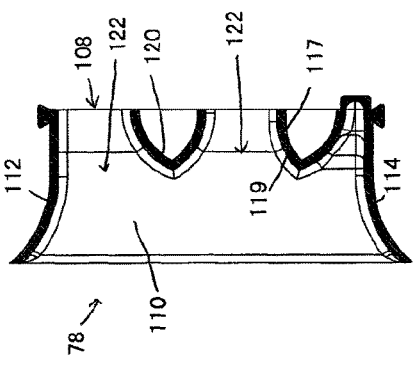
FIG. 55
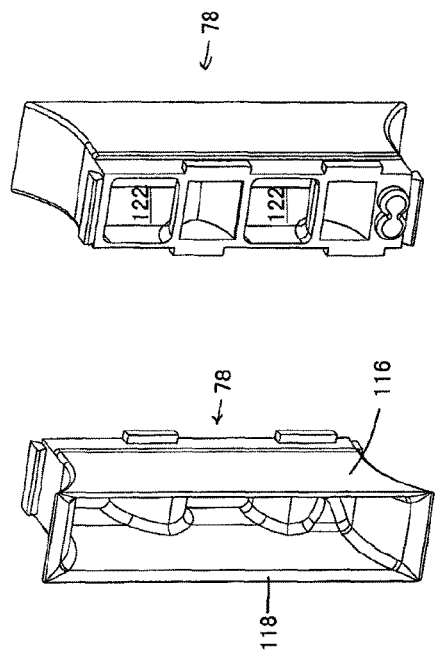
FIG. 51
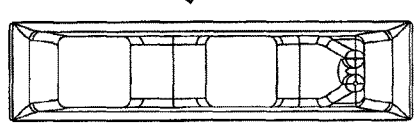
FIG. 53
FIG. 50

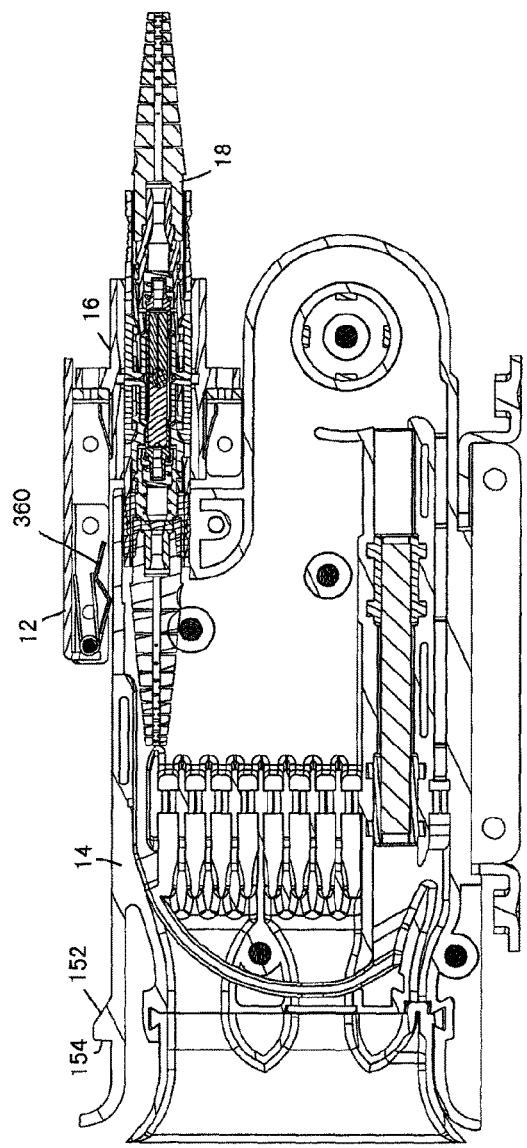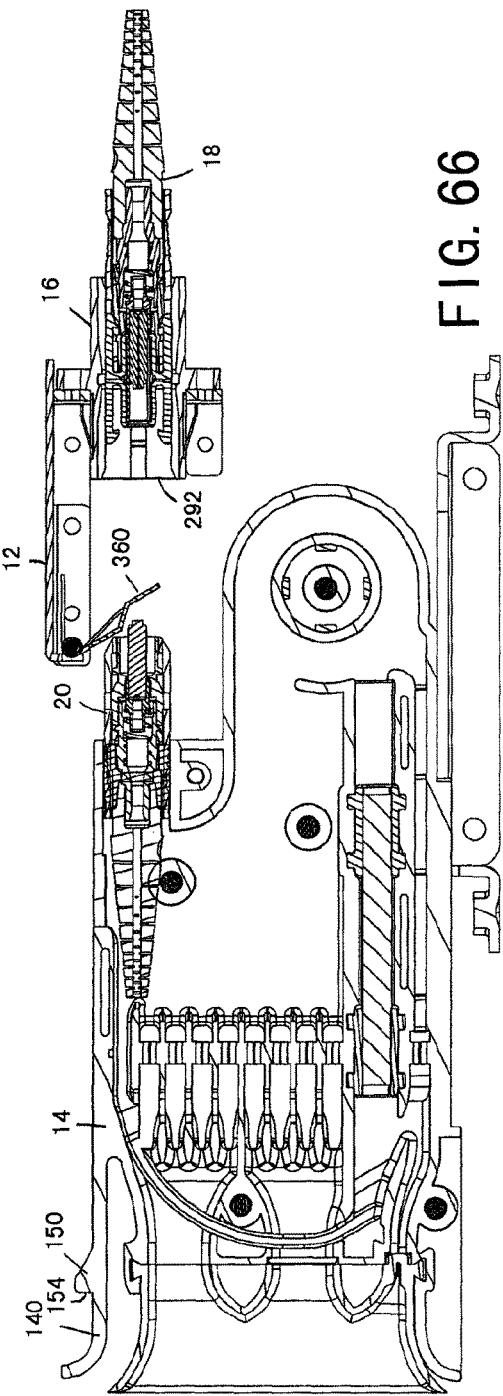

FIBER OPTIC MODULE AND CHASSIS

CROSS REFERENCE TO RELATED APPLICATIONS

This application is a continuation of U.S. application Ser. No. 14/995,374, filed Jan. 14, 2016, now U.S. Pat. No. 9,618,719, which is a continuation of U.S. application Ser. No. 13/643,697, filed Oct. 26, 2012, now U.S. Pat. No. 9,239,442, issued Jan. 19, 2016, which is a National Stage Application of PCT/CN2010/072247, filed Apr. 27, 2010, and which applications are incorporated herein by reference. To the extent appropriate, a claim of priority is made to the above disclosed applications.

FIELD

The present disclosure generally relates to fiber optic telecommunications equipment. More specifically, the present disclosure relates to fiber optic modules and chassis for holding fiber optic modules.

BACKGROUND

In fiber optic telecommunications systems, it is common for optical fibers of transmission cables to be split into multiple strands, either by optical splitting of a signal carried by a single stranded cable or by fanning out the individual fibers of a multi-strand cable. Further, when such systems are installed, it is known to provide excess capacity in the installations to support future growth and utilization of the fibers. Often in these installations, modules including splitters or fanouts are used to provide the connection between transmission fibers and customer fibers. To reduce the cost and complexity of the initial installation and still provide options for future expansion, a module mounting chassis capable of mounting multiple modules may be used in such an installation.

While the demand for added capacity is growing rapidly, this demand is being met in part by increasing the density of fiber optic transmission equipment. Even though fiber optic equipment permits higher levels of transmission in the same or smaller footprint than traditional copper transmission equipment, the demand requires even higher levels of fiber density. This has led to the development of high-density fiber handling equipment.

Further improvements in adding fiber optic capacity and increasing density are desired.

SUMMARY

The present disclosure relates to a telecommunications assembly including a chassis and a plurality of modules mounted within the chassis. The modules include one or more fiber optic signal input locations. The modules include optical equipment for splitting the input signals into customer output signals.

According to one example embodiment, the fiber optic signal input location is provided by a connector protruding from the module. Within an interior of the chassis at each mounting location are positioned corresponding fiber optic adapters. Inserting the module through a front opening of the chassis at a mounting location positions the connectors of the modules for insertion into and mating with the adapters of the chassis. According to another example embodiment, the fiber optic signal input location is provided at the front of the module housing.

BRIEF DESCRIPTION OF THE DRAWINGS

A brief description of the drawings is as follows:

FIG. 2 is a right side view of the telecommunications assembly of FIG. 1;

FIG. 3 is a left side view of the telecommunications assembly of FIG. 1;

FIG. 4 is a top view of the telecommunications assembly of FIG. 1;

FIG. 19 is a front perspective view of one of the fiber optic modules of FIG. 1;

FIG. 20 is a rear perspective view of the fiber optic module of FIG. 19;

FIG. 21 is a top view of the fiber optic module of FIG. 19;

FIG. 22 is a bottom view of the fiber optic module of FIG. 19;

FIG. 23 is a right side view of the fiber optic module of FIG. 19, shown without a cover exposing the interior features of the fiber optic module including routing of a fiber optic cable within the fiber optic module;

FIG. 24 is a cross-sectional view taken along section line 24-24 of FIG. 23;

FIG. 26 illustrates a front perspective view of the fiber optic module of FIGS. 19-25, the fiber optic module configured as a front-input module;

FIG. 27 is a rear perspective view of the fiber optic module of FIG. 26;

FIG. 28 is a top view of the fiber optic module of FIG. 26;

FIG. 29 is a bottom view of the fiber optic module of FIG. 26;

FIG. 30 is a right side view of the fiber optic module of FIG. 26, shown without a cover exposing the interior features of the fiber optic module including routing of a fiber optic cable within the fiber optic module;

FIG. 31 is a cross-sectional view taken along section line 31-31 of FIG. 30;

FIG. 33 is a front perspective view of the main housing portion of the fiber optic module of FIGS. 19-32, the main housing portion shown in isolation without the internal components mounted therein;

FIG. 34 is a rear perspective view of the main housing portion of FIG. 33;

FIG. 35 is a right side view of the main housing portion of FIG. 33;

FIG. 36 is a left side view of the main housing portion of FIG. 33;

FIG. 37 is a bottom view of the main housing portion of FIG. 33;

FIG. 38 is a top view of the main housing portion of FIG. 33;

FIG. 39 is a front view of the main housing portion of FIG. 33;

FIG. 40 is a front perspective view of the cover of the fiber optic module of FIGS. 19-32;

FIG. 41 is a rear perspective view of the cover of FIG. 40;

FIG. 42 is a right side view of the cover of FIG. 40;

FIG. 43 is a left side view of the cover of FIG. 40;

FIG. 44 is a top view of the cover of FIG. 40;

FIG. 45 is a front view of the cover of FIG. 40;

FIG. 50 is a front perspective view of the cable exit structure of the fiber optic module of FIGS. 19-32;

FIG. 51 is a rear perspective view of the cable exit structure of FIG. 50;

FIG. 52 is a left side view of the cable exit structure of FIG. 50;

FIG. 53 is a front view of the cable exit structure of FIG. 50;

FIG. 54 is a rear view of the cable exit structure of FIG. 50;

FIG. 55 is a cross-sectional view taken along section line 55-55 of FIG. 54;

FIG. 56 is a top view of the cable exit structure of FIG. 50;

FIG. 66 is a side cross-sectional view of the fiber optic module of FIG. 64 within the chassis, taken through the center of the fiber optic module; and FIG. 67 is a side cross-sectional view of the fiber optic module of FIG. 65 within the chassis, taken through the center of the fiber optic module.

DETAILED DESCRIPTION

Figure 1:
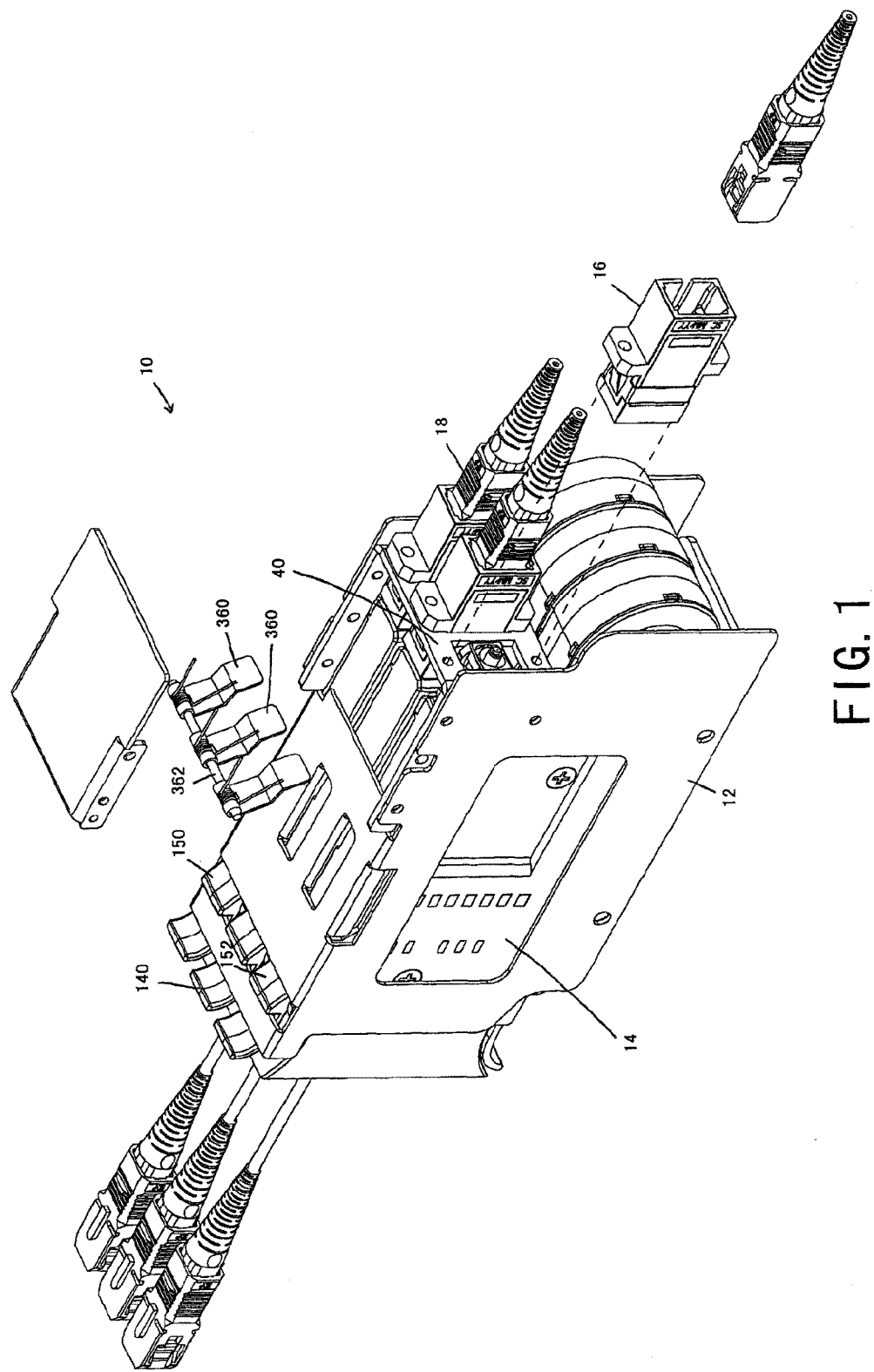
FIG. 1 is a rear perspective view of a telecommunications assembly with a plurality of fiber optic modules installed within a chassis, with one of the adapters and the shield structures exploded out of the telecommunications assembly.
Figure 6:
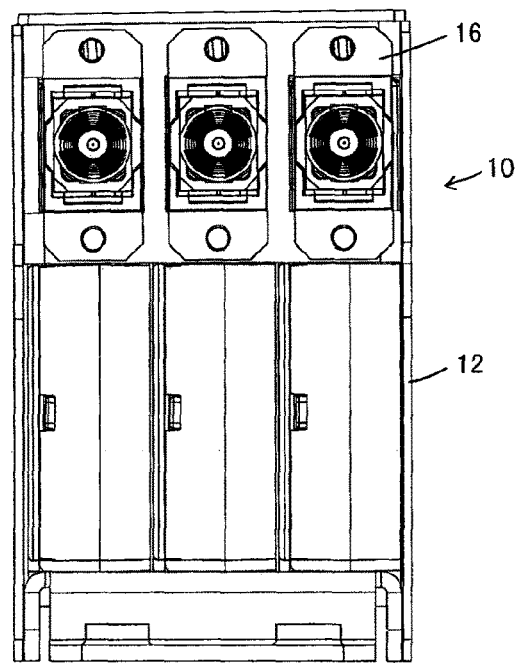
FIG. 6 is a rear view of the telecommunications assembly of FIG. 1.
Figure 5:
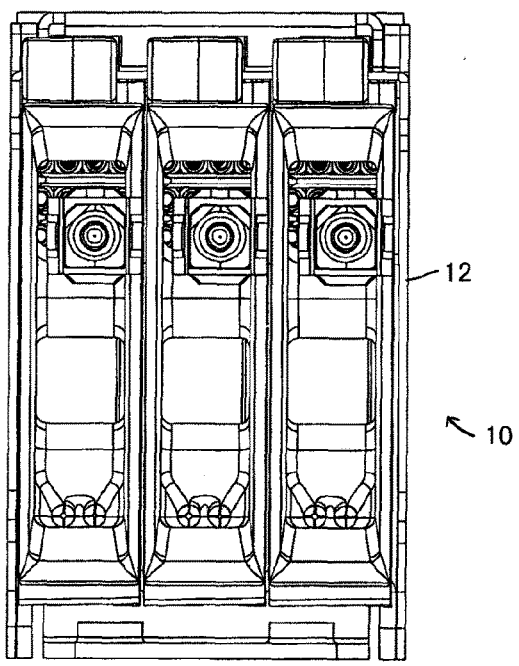
FIG. 5 is a front view of the telecommunications assembly of FIG. 1.

FIGS. 1-6 illustrate a telecommunications assembly 10 that includes a telecommunications chassis 12 and a plurality of fiber optic modules 14 adapted to be mounted within the chassis 12. The fiber optic modules 14 are configured to be slidably inserted within the chassis 12 through a front opening 34. According to one example embodiment, the fiber optic signal input location is provided by a connector 20 protruding from the rear of the fiber optic modules 14. For each mounting location 52 of the chassis 12, there are positioned corresponding fiber optic adapters 16. Inserting the module 14 through the front opening 34 of the chassis 12, at a mounting location 52, positions the connectors 20 of the modules 14 for insertion into and mating with the adapters 16 of the chassis 12. The adapters 16 form connection locations between the connectors 18 terminated to an incoming fiber optic cable and the connectors 20 of the modules 14 mounted within the chassis 12 (e.g., when the modules are configured as rear-input modules). The adapters 16 are similar to those shown in commonly-owned U.S. Pat. No. 5,317,663, the disclosure of which is incorporated herein by reference in its entirety. As will be discussed below, in other embodiments, the fiber optic signal input location may be provided at the front of the module housing and the chassis may be configured accordingly.

The chassis 12 of the telecommunications assembly 10 includes a top wall 26 and a bottom wall 28 extending between a pair of opposing transverse sidewalls, the right sidewall 30 and the left sidewall 32, a rear wall 40, and the front opening 34. Depending upon the signal input location used on the fiber optic modules 14 as will be discussed in further detail below, the rear wall 40 of the chassis may or may not be configured for mounting adapters 16 for mating with connectors 20 protruding from the modules 14. As shown in FIG. 1, for embodiments of the chassis that are configured to receive rear signal input modules, the chassis 12 includes spring-mounted shields 360 that are biased downwardly. The shields 360 are mounted to the chassis 12 via a pin 362. The shields 360 are located adjacent the rear of the chassis 12 and are positioned in front of the adapters 16. The shields 360 are configured to provide protection against accidental exposure to fiber optic light. Insertion of the splitter module 14 into the chassis 12 pushes the shields 360 out of the way, and the connector 20 of the module 14 can be coupled to the adapter 16 mounted at the rear wall 40 of the chassis 12 as shown in FIGS. 63-67.

Although the chassis shown in the present disclosure are depicted as being able to accommodate three fiber optic modules 14, the chassis depicted herein are simply example embodiments, and different sized chassis may be provided as part of the telecommunications assembly 10, depending upon the density of the system. There might be embodiments that hold twelve or even twenty-four fiber optic modules 14.

The chassis 12 shown in FIGS. 1-12 is configured to occupy one standard unit (RU) of rack space within a standard telecommunications rack. In such an embodiment, the chassis 12 may include a height between about 2 and 3 inches. More preferably, the chassis 12 may include a height of about 2.3 inches or about 2.322 inches.

Figure 7:
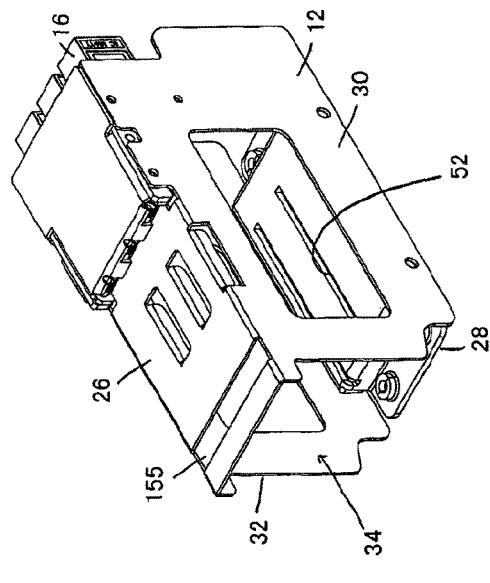
FIG. 7 is a front perspective view of the chassis configured to house a plurality of the fiber optic modules shown in FIG. 1, the chassis shown with a plurality of adapters mounted therein.
Figure 12:
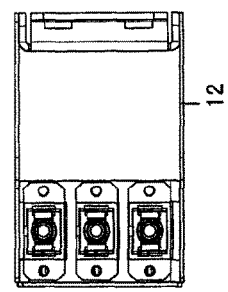
FIG. 12 is a rear view of the chassis of FIG. 7.
Figure 10:
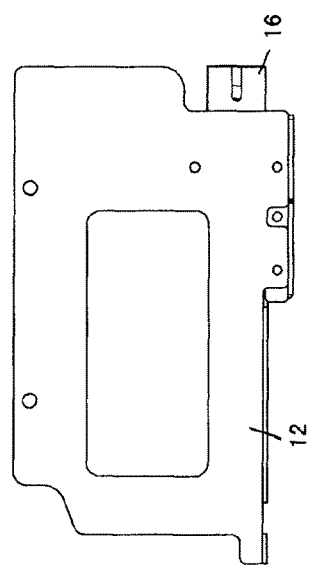
FIG. 10 is a left side view of the chassis of FIG. 7.
Figure 8:
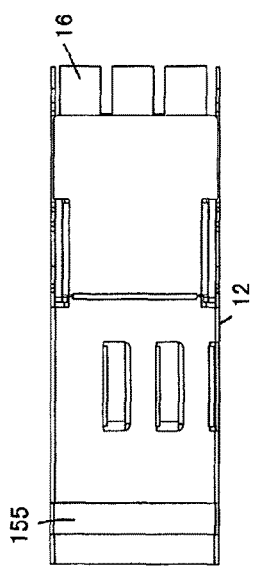
FIG. 8 is a top view of the chassis of FIG. 7.
Figure 9:
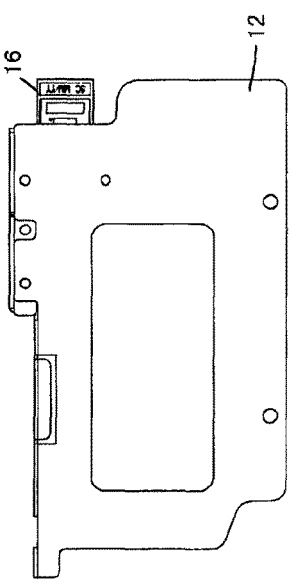
FIG. 9 is a right side view of the chassis of FIG. 7.
Figure 11:
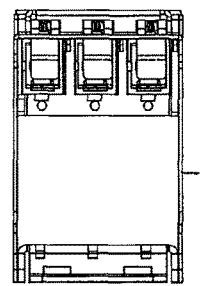
FIG. 11 is a front view of the chassis of FIG. 7.
Figure 13:
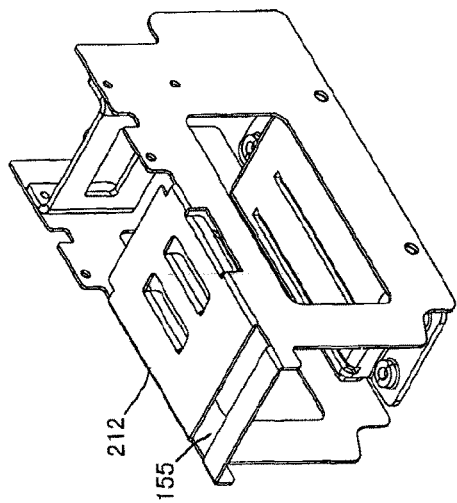
FIG. 13 is a front perspective view of another embodiment of a chassis configured to house a plurality of the fiber optic splitter modules having front signal input locations.
Figure 18:
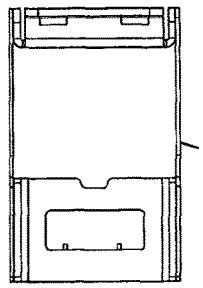
FIG. 18 is a rear view of the chassis of FIG. 13.
Figure 16:
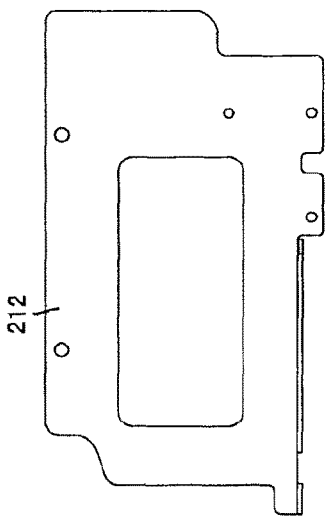
FIG. 16 is a left side view of the chassis of FIG. 13.
Figure 14:
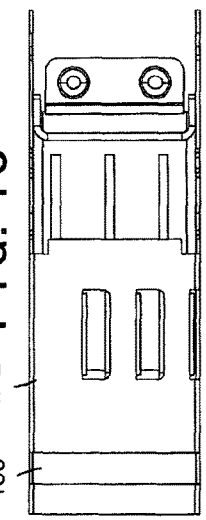
FIG. 14 is a top view of the chassis of FIG. 13.
Figure 15:
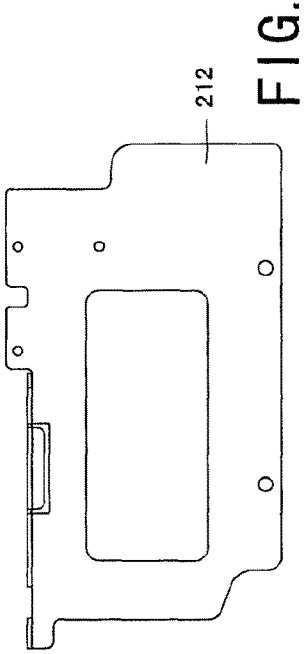
FIG. 15 is a right side view of the chassis of FIG. 13.
Figure 17:
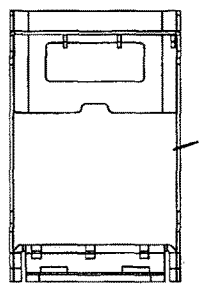
FIG. 17 is a front view of the chassis of FIG. 13.

Referring to FIG. 7, the chassis 12 includes a plurality of mounting locations 52 for slidably receiving the modules 14. Referring to FIG. 1, the rear wall 40 of the chassis 12 is configured for mounting adapters 16. As previously noted, for chassis that are configured to receive fiber optic modules 14 that are set-up as front input modules, the rear wall of the chassis does not include fastener-based mounting locations for mounting adapters 16. Such an embodiment of a chassis 212 is shown in FIGS. 13-18.

For all embodiments of the chassis, adjacent the front end 157 of the chassis, the top wall defines a slot 155. The slot 155 is for receiving a latching tab 150 of a flexible latch 140 of a fiber optic module 14. As shown in FIG. 1, the latching tab 150 includes a ramped face 152 that causes the flexible latch 140 to elastically deflect downwardly when a module 14 is being inserted into chassis 12. The latching tab 150 also includes a square face 154 that is configured to act as a stop within the slot 155 for keeping the module 14 snap-fit within the chassis 12. The removal of the module 14 from the chassis 12 is performed by pressing the latch 140 downwardly to clear the square face 154 of tab 150 from the slot 155 and sliding module 14 away from the chassis 12.

FIGS. 19-25 illustrate one of the fiber optic modules 14 of the assembly. The module 14 shown in FIGS. 19-25 is configured as a rear-input module having a signal-input location 68 that is located adjacent the rear 70 of the module 14 for inputting a fiber optic signal into the module 14. As previously noted and as will be described in further detail, the module can be configured as a front-input module that has signal-input locations adjacent the front 72 of the module. FIGS. 26-32 illustrate the module configured as a front-input module. When a module 14 is used in a front-input configuration, an aperture 182 at the rear wall 90 of the module 14 that is normally used to receive a fiber optic connector 20 may be covered by an insert piece 244. It should be noted that the fiber optic module 14, whether it is configured as a rear-input module or a front-input module, utilizes generally the same module components such as the main housing portion 74, the cover 76, the cable exit structure 78, and the fiber retainer 80.

Figure 25:
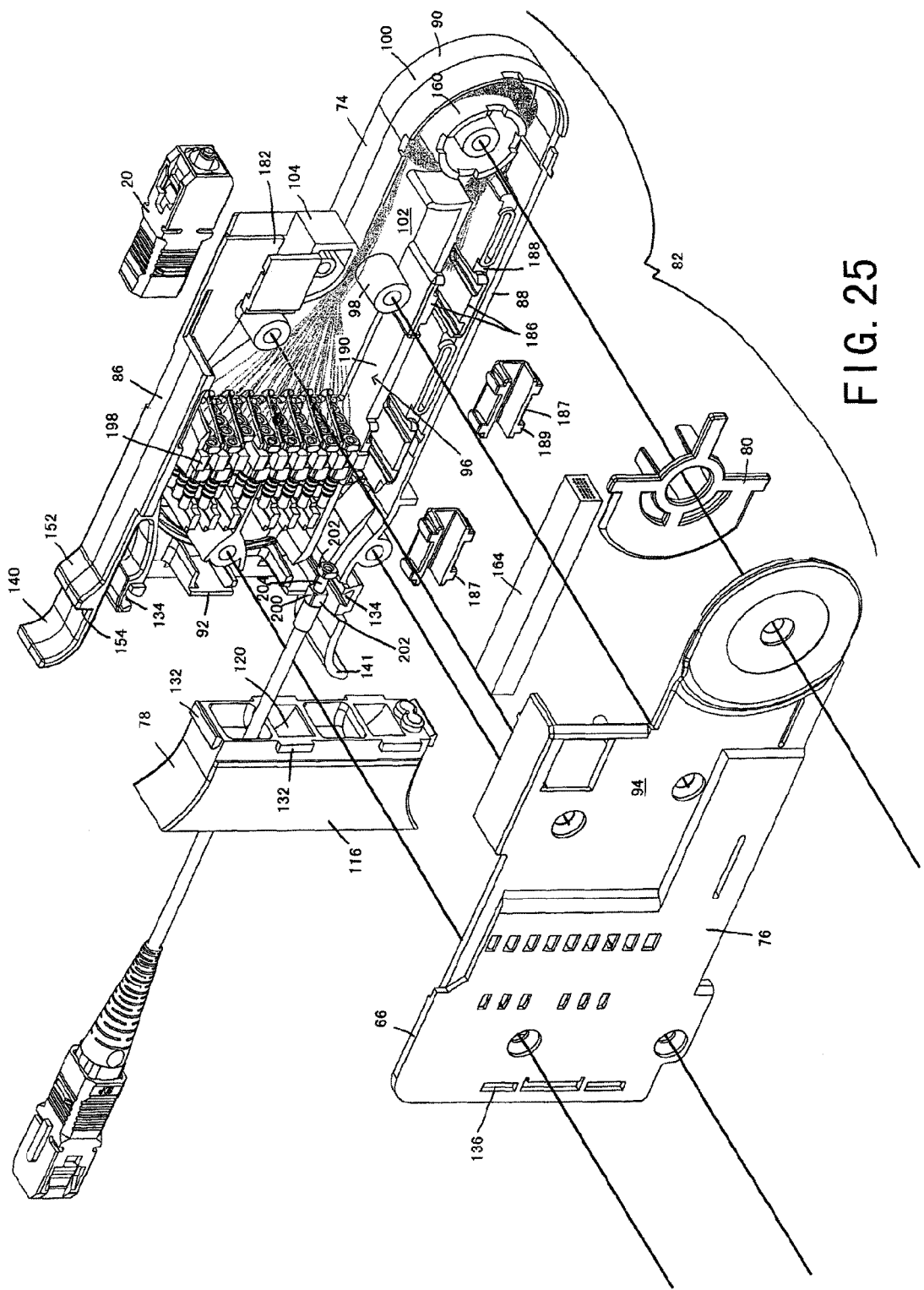
FIG. 25 is an exploded view of the fiber optic module of FIG. 19.

Referring now to FIG. 25, the fiber optic module 14 includes a module housing 82. The module housing 82 includes the main housing portion 74 (shown in isolation in FIGS. 33-39) and the removable cover 76 (shown in isolation in FIGS. 40-45). The main housing portion 74 includes a first transverse sidewall 84 (i.e., a left sidewall) extending between a top wall 86, a bottom wall 88, a rear wall 90, and a front wall 92. Removable cover 76 defines a second transverse wall 94 (i.e., a right sidewall) of the module housing 82 and closes off the open side 96 of the module main housing 74.

The cover 76 is mounted to the main housing portion 74 by fasteners. through fastener mounts 98 defined on main housing portion 74 (see FIG. 25). The bottom wall 88 of the main housing portion 74 defines a bottom mounting flange 64 and the top end of the cover 76 defines a top mounting flange 66 for sliding the module 14 into the chassis 12. The bottom wall 88 and the bottom flange 64 define a channel 65 that provides a keying system with the chassis 12 for correctly orienting the fiber optic modules 14 during insertion.

A height HM of the module 14 is defined between the top wall 86 and the bottom wall 88. The height HM of the module 14 is preferably configured for mounting the module 14 within a chassis occupying one standard unit (RU) of rack space within a standard telecommunications rack. In such an embodiment, the module 14 may include a height HM of between about 2 and 3 inches. More preferably, the module 14 may include a height HM of about 2.166 inches.

The rear wall 90 of main housing portion 74 includes a curved portion 100 configured to provide bend radius protection to cables within the interior 102 of the main housing 74. The rear wall 90 of the main housing 74 also includes an inset portion 104. As shown, a fiber optic connector 20 positioned at the inset portion 104 protrudes rearwardly from the rear wall 90 for mating with a fiber optic adapter 16 mounted adjacent the rear 40 of the chassis 12.

Figure 32:
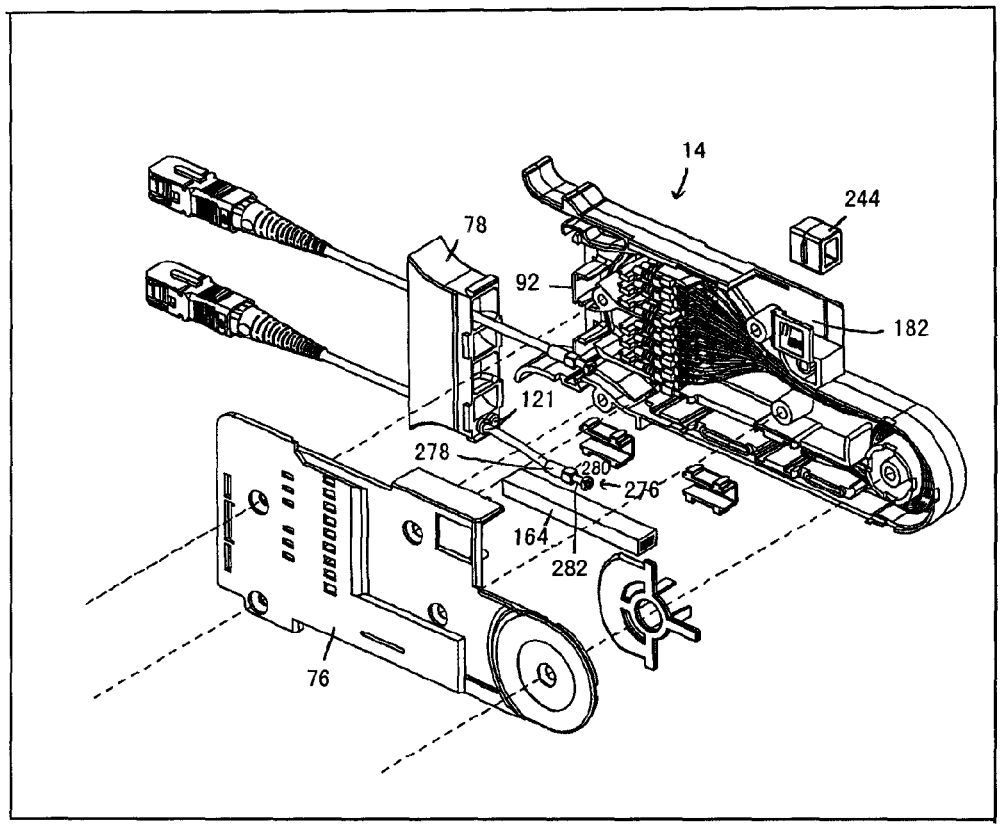
FIG. 32 is an exploded view of the fiber optic module of FIG. 26.
Figure 47:
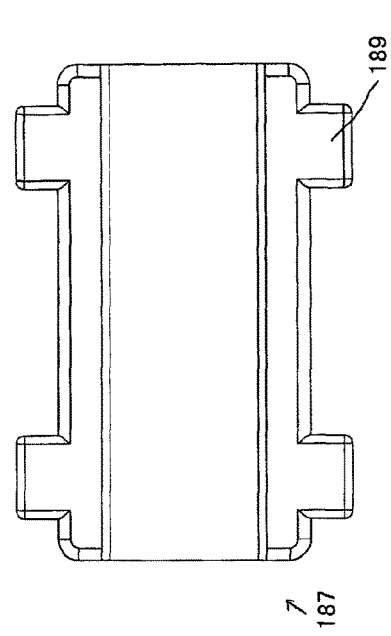
FIG. 47 is a right side view of the friction clamp of FIG. 46.
Figure 48:
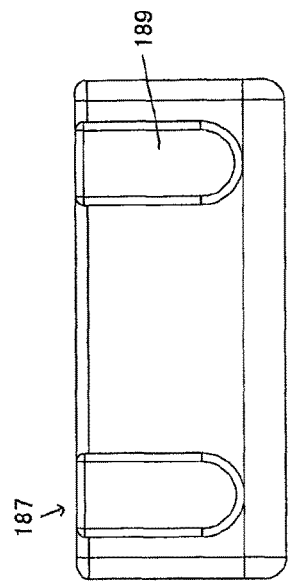
FIG. 48 is a bottom view of the friction clamp of FIG. 46.
Figure 46:
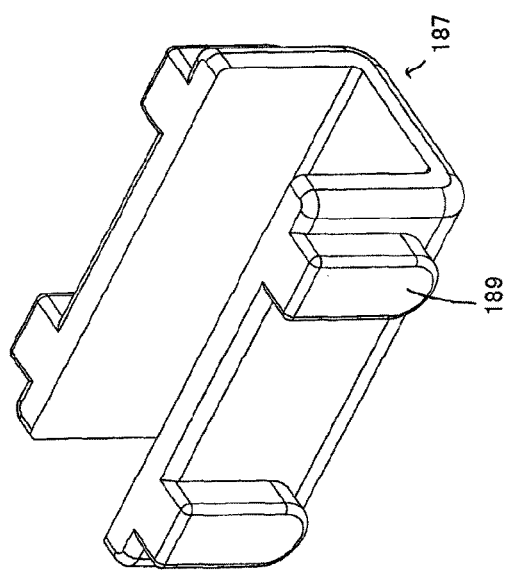
FIG. 46 is a rear perspective view of a friction clamp configured for use with the fiber optic module of FIGS. 19-32.
Figure 49:
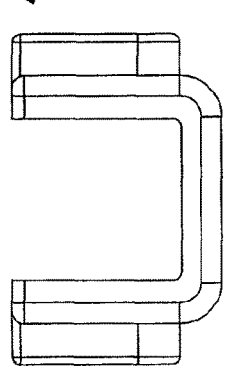
FIG. 49 is a front view of the friction clamp of FIG. 46.
Figure 62:
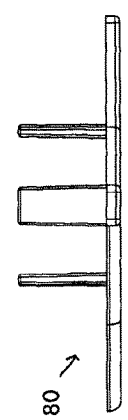
FIG. 62 is a top view of the fiber retainer of FIG. 57.
Figure 59:
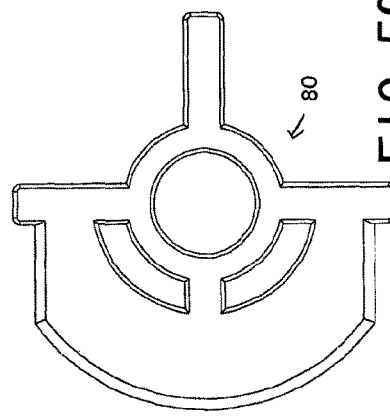
FIG. 59 is a right side view of the fiber retainer of FIG. 57.
Figure 61:
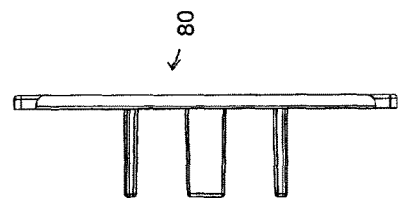
FIG. 61 is a front view of the fiber retainer of FIG. 57.
Figure 58:
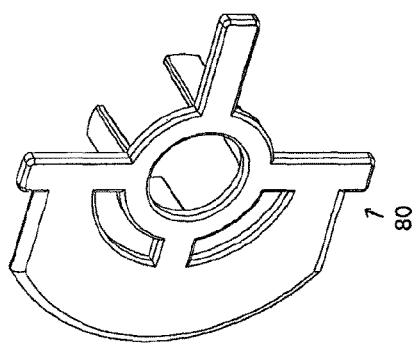
FIG. 58 is a rear perspective view of the fiber retainer of FIG. 57.
Figure 57:
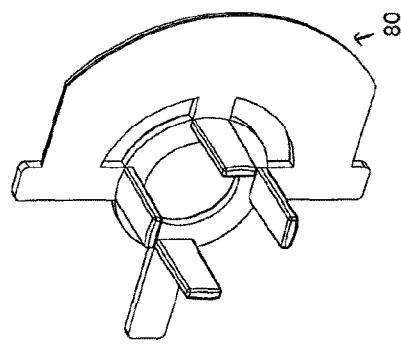
FIG. 57 is a front perspective view of a fiber retainer configured to be coupled to the main housing portion of the fiber optic module as shown in FIG. 25.
Figure 60:
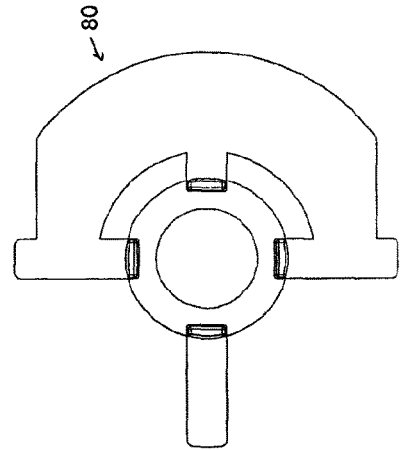
FIG. 60 is a left side view of the fiber retainer of FIG. 57.

Each module 14 includes a cable exit structure 78 extending from the front wall 92 of module main housing 74. The cable exit structure 78 is shown in detail in FIGS. 50-56. The cable exit structure 78 defines a front end 106 and a back end 108 and an opening 110 extending therebetween. The cable exit structure 78 defines a top wall 112, a bottom wall 114, a right sidewall 116, and a left sidewall 118. A first partition 120 adjacent the back end 108 of the cable exit structure 78 divides the opening 110 into two distinct channels 122 at the rear end 108. A bulkhead 119 at the back end 108, adjacent the bottom wall 114, can be used as a second partition 117 when the module 14 is used as a front-input module. As shown in FIG. 32, two openings 121 are punched out from the cable exit structure 78 for insertion of input cables into the main housing portion 74. When the two openings 121 are punched out, the bulkhead 119 provides a second partition 117 at the back end 108 of the cable exit structure 78 and divides the main opening into three distinct channels 122. The partitions 117, 120 may include curved surfaces for guiding cables downwardly and/or upwardly while providing bend radius protection.

As shown in FIG. 25, the cable exit structure 78 is slidably mounted to main housing 74 and captured by the cover 76. The cable exit structure 78 defines protruding lips 132 that are slidably inserted into recesses 134 defined around the front apertures/channels 130 of the main housing 74. The cover 76 also includes slits 136 that receive protruding lips 132 defined at the right sidewall 116 of the cable exit structure 78. As shown in FIGS. 21 and 22, the cable exit structure 78 is preferably sized thin enough to fit within the profile of the fiber optic module 14 to preserve the density of the telecommunications assembly 10.

Still referring to FIG. 25, the main housing 74 (shown in isolation in FIGS. 33-39) of the module 14 includes an integrally formed flexible latch 140 (i.e., cantilever arm) that is adapted to engage a portion of the chassis 12 to hold module 14 within the chassis 12. Flexible latch 140 also deflects to permit withdrawal of the module 14 from the chassis 12. Opposite the flexible latch 140, the main housing portion 74 also includes a fixed handle 141 defined by the bottom wall 88. A user can grasp the handle 141 and the latch 140 at the same time for pulling or pushing purposes. Within interior 102 of main housing 74, the module 14 includes a first radius limiter 160 (e.g., a spool) adjacent the curved portion 100 of the rear wall 90 of the main housing 74. A fiber retainer 80 (shown in detail in FIGS. 57-62) may be placed on the main housing portion 74 to keep cables wrapped around the first radius limiter 160. The fiber retainer 80 includes a generally circular shape to match the contour of the curved portion 100 of the rear wall 90 of the main housing 74.

A connector 20 of the module 14 projects out from rear wall 90 at the inset portion 104 of the rear wall 90. The connector 20 of the module 14 is slidably inserted into a connector aperture 182 defined at the rear wall 90 of the main housing 74. Once slidably inserted, the connector 20 is captured within the housing 82 by the cover 76.

Adjacent the bottom wall 88 of the main housing 74, within the interior 102, is placed an optical component 164 such as a fiber optic splitter or a fan-out. It should be noted that although the modules 14 of the present disclosure are depicted and described as being splitter modules, other types of telecommunications equipment such as combiners, attenuators, equalizers, multiplexers/demultiplexers, etc. may be provided in the modules 14.

The optical component 164 is held within the interior 102 of the main housing 74 by a clamp structure 186. The clamp structure 186 includes a pair of friction clamps 187 (e.g., a rubber gasket) that are inserted between an upper clamp wall 190 and a lower clamp wall 188. The upper and the lower clamp walls 190, 188 define notches 194 for slidably receiving tabs 189 of the friction clamps 187. The friction clamps 187 are made from materials having a high coefficient of friction to frictionally hold the optical component 164 within the clamp structure 186. One of the friction clamps 187 is shown in isolation in detail in FIGS. 46-49.

It should be noted that different optical components may have different thicknesses and may require the use of different sized clamp structures including the clamp walls and the friction clamps for holding the optical component in place. The bottom clamp wall 188 is positioned to leave a space 196 between the bottom wall 88 of the main housing 74 and the bottom clamp wall 188 for accommodating fiber optic cables that are routed within the module 14 (see FIGS. 23 and 30). When the module 14 is used as a front input module, input cables are also routed through the space 196, as will be discussed in further detail below.

Still referring to FIG. 25, the module main housing 74 also includes integrally formed crimp holders 198 (e.g., slots) extending in a stacked arrangement generally from the top wall 86 to the top clamp wall 190 of the module main housing 74. Crimp elements 200 crimped to ends of cables that are split by the optical component 164 are slidably received into the crimp holders 198. Each crimp element 200 defines square flanges 202 between which is defined a recessed portion 204. The crimp holders 198 include complementary structure to the crimp elements 200 such that once the crimp elements 200 are slidably inserted into the crimp holders 198, the crimp elements 200 are prevented from moving in a longitudinal direction. Once slidably inserted, crimp elements 200 are held in place by the cover 76 that is mounted to the splitter module main housing 74. In the embodiment shown, there are eight crimp holding slots 198, each one being able to accommodate up to four crimp elements 200 for a total output capacity of thirty-two cables. As such, a 1:32 fiber optic splitter may be housed within the module 14. Other numbers are possible.

The topmost crimp holder defines a wall 191 adjacent the top wall 86 of the main housing 74 (see FIGS. 34 and 35). The wall 191 is positioned to leave a space 193 for guiding fiber optic cables during routing of the cables within the module 14.

The main housing portion 74 also includes cable management structures 195 located between the crimp holders 198 and the front wall 92 of the main housing 74. The cable management structures 195 are defined as protrusions that extend from the left transverse sidewall 84 of the main housing 74 toward the cover 76. The protrusions defining the cable management structures 195 define channels that align with the slots created by the crimp holders 198 for guiding cables out of the module 14. The protrusions define eight channels for the eight crimp holding slots 198.

Adjacent the front wall 92 of the main housing 74, the module 14 includes a bulkhead 201 that separates the front wall 92 of the main housing 74 into two exit channels 130. In addition to guiding cables to the cable exit structure 78, the bulkhead 201 also defines a slot 203 for allowing cables to be routed in a direction from the top wall 86 toward the bottom wall 88 of the module. The top clamp wall 190 and the bottom clamp wall 188 also define slots 205 for allowing cables to be routed into the space 196 formed adjacent the bottom wall 88 of the main housing 74.

FIG. 23 shows the fiber optic splitter module 14 without the cover 76 exposing the interior features of fiber optic splitter module 14 including a sample routing of a fiber optic cable within the fiber optic splitter module 14, when the module is used as a rear input module. In the example embodiment shown and described, the optical component 164 is a fiber optic splitter that splits the signal of a single strand to a plurality of secondary signals. In another embodiment, the first cable may be a multi-strand fiber cable with a plurality of strands of optical fiber, and the optical component may be a fanout to separate the individual strands into each of a plurality of second cables.

If a splitter is utilized, the splitter may be a 1×32 splitter. Other splitter configurations such as a 1×16 or 2×16, etc., could be used in other embodiments.

An outside cable may extend to the rear end of an adapter 16 within the chassis 12 and be terminated by a connector 18 that is optically connected to the connector 20 of the module 14 through the adapter 16 once the module is inserted within chassis 12. Once the first cable 270 is split, second cables 272 extend from optical component 164 and are looped around first radius limiter 160 before being directed toward the crimp holders 198. From the crimp holders 198, cables 274 crimped to the other ends of the crimps 200 exit the module 14 through the cable exit structure 78.

It should be noted that the routing of the fiber optic cables within module 14, as shown in FIG. 23, is only one example and other ways of routing the cables within the module 14 are possible.

It should be noted that although the connectors 18, 20 and the adapters 16 depicted herein are of the SC type, other types, formats, styles, and sizes of telecommunications connectors and adapters may be used.

As discussed above, the module 14 can be configured as a front-input module that has signal-input locations/connections 276 adjacent the front wall 92 of the module main housing 74. Referring to FIGS. 26-32, the module 14 is shown configured as a front-input module that may have two front signal-input locations 276 in a stacked arrangement extending from the left sidewall 84 to the right sidewall 94 defined by the cover 76. As described previously, two openings 121 may be punched out from the cable exit structure 78 for insertion of input cables into the main housing portion 74. The number of openings 121 used may be based on the type of splitter (1×32, 1×16, 2×16, etc.) or other optical elements provided in the module housing 82.

As shown in FIG. 32, each input connection 276 includes a boot 278 that mates with a crimp element 280. The crimp element 280 defines a circumferential notch 282 (i.e., recessed portion). The circumferential notch 282 is slidably inserted into a crimp holding structure 289 defined between the bottom wall 88 of the main housing portion 74 and the bottom clamp wall 188. The crimp elements 280 of the input connections 276 are captured by the cover 76 when the cover 76 is mounted on the module main housing 74.

As discussed previously, when the module 14 is used as a front-input module, the aperture 182 that is normally used to receive the fiber optic connector 20 for inputting the input signal may be covered by an insert piece 244 (see FIG. 32).

FIG. 30 shows the fiber optic splitter module 14 without the cover 76 exposing the interior features of fiber optic splitter module 14 when the module is configured as a front-input module. FIG. 30 also illustrates a sample routing of a fiber optic cable within fiber optic splitter module 14.

As shown in FIG. 30, a first cable 270 extends from the front input connection 276 toward the rear end of the module 14, passing underneath the clamp structure 186 through the space 196 defined between the bottom wall 88 of the main housing 74 and the clamp structure 186 toward the first radius limiter 160. After going around the radius limiter 160, the cable 270 is directed toward the front of the module 14. The cable is routed through the slot 203 defined by the bulkhead 201 and directed into the optical component 164. Once the first cable 270 is split, second cables 272 extend from the optical component 164 and are looped around first radius limiter 160 before heading toward the crimp holders 198. From the crimp holders 198, cables 274 crimped to the other ends of the crimps 200 exit the module 14 through the cable exit structure 78.

Fiber optic modules that are similar to the modules 14 described herein are shown and described in commonly-owned U.S. Pat. Nos. 7,376,322; 7,400,813; 7,376,323; and 7,346,254, the entire disclosures of which are incorporated herein by reference.

Figure 65:
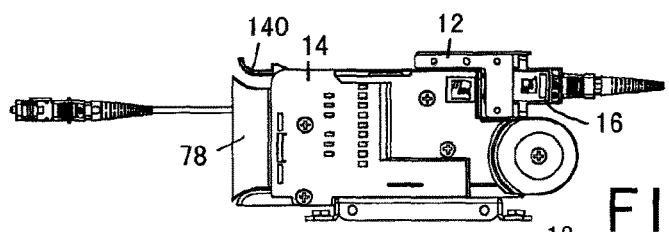
FIG. 65 illustrates the fiber optic module of FIG. 63, shown in a fully inserted position within the chassis.
Figure 64:
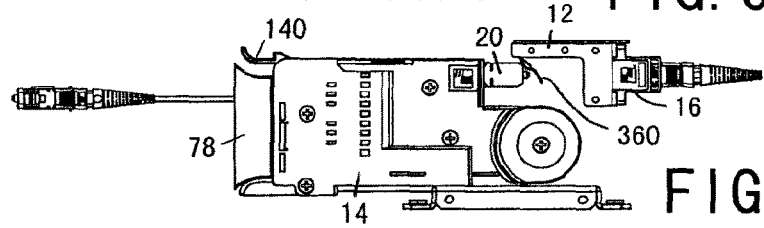
FIG. 64 illustrates the fiber optic module of FIG. 63, shown in a position within the chassis with the connector of the fiber optic module making initial contact with the shield.
Figure 63:
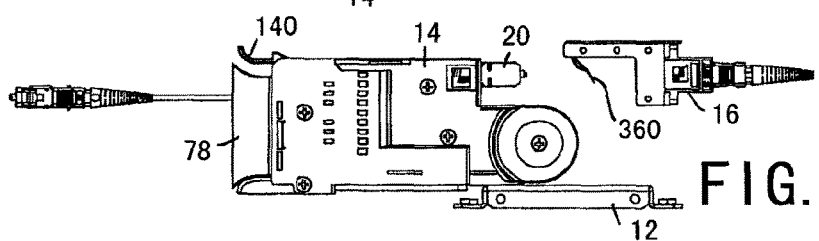
FIG. 63 illustrates a fiber optic module partially inserted within the chassis of FIG. 1, the chassis including an adapter mounted thereon, the fiber optic module shown in a position prior to the connector of the module having contacted a shield located within the chassis.

The insertion of a module 14 into the chassis 12 of the telecommunications assembly 10 is illustrated in FIGS. 63-67. FIG. 63 illustrates the fiber optic module 14 partially inserted, wherein the module 14 is shown in a position prior to the connector 20 of the module 14 having contacted the spring biased shield 360 located within the chassis 12. FIG. 64 illustrates the module 14 in a position with the connector 20 making initial contact with the shield 360. FIG. 65 illustrates the module 14 in a fully inserted position within the chassis 12.

FIG. 66 is a side cross-sectional view of the fiber optic module 14 within the chassis 12, taken through the center of the fiber optic module 14, wherein the module 14 is in a position within the chassis 12 with the connector 20 making initial contact with the shield. FIG. 67 is a side cross-sectional view of the module 14 within the chassis 12, taken through the center of the module 14, wherein the module 14 is in a fully inserted position within the chassis 12.

As the shield 360 is fully deflected, further insertion of the module 14 brings the connector 20 of the module 14 into contact with the adapter 16 and the connector 20 is received within the front end 292 of the adapter 16. The flexible latch 140 is deflected downwardly as the module 14 is inserted and then flexes back upwardly so that the latching tab 150 of the main housing 74 is captured within the slot 155 for keeping the module 14 snap-fit within the chassis 12. The module 14 is now in position to process and transmit signals through first cable 270, optical component 164, and second cable 272 within the module interior. The removal of the module 14 from the chassis 12 is performed by pressing the latch 140 downwardly to clear the square face 154 of the latching tab 150 from the slot 155 and sliding the module 14 away from the chassis 12.

What is claimed is:

1. A telecommunications assembly comprising:
   A. a chassis defining a plurality of mounting locations for slidably receiving telecommunications modules; and
   B. a telecommunications module inserted into one of the mounting locations of the chassis, the telecommunications module comprising:
      i. a housing defining at least one signal input location and at least one signal output location; and
      ii. a friction clamp located within the housing for removably mounting an optical component that can receive a fiber optic input signal coming in from the signal input location and output a fiber optic output signal going toward the signal output location, the friction clamp defining a top portion and a bottom portion that are slidably inserted between an upper clamp wall and a lower clamp wall defined within the housing, wherein the upper clamp wall and the lower clamp wall define opposing notches and the top and bottom portions define keying tabs, respectively, for slidable mating with the notches of the upper and lower clamp walls, the friction clamp defining an open end configured to slidably receive the optical component therethrough and fixedly retain the optical component with respect to the housing solely via frictional force from both the top and bottom portions of the friction clamp, wherein the friction clamp is configured such that the optical component is not received within the housing without first contacting the top and bottom portions.

2. A telecommunications assembly according to claim 1, wherein a fiber optic adapter that is mounted to the chassis separately from the telecommunications module is configured to mate with a connector that protrudes from the housing when the telecommunications module is inserted into the chassis.

3. A telecommunications assembly according to claim 2, wherein each mounting location includes a spring-loaded shield for blocking light off a front end of the fiber optic adapter, the shield movable between an operating position and a non-operating position, the shield configured to be moved from the operating position to the non-operating position by the telecommunications module when the module is slidably inserted within the chassis.

4. A telecommunications assembly according to claim 1, wherein a height of the telecommunications module is between 2 and 3 inches and configured to fit within one standard unit (RU) of rack space in a standard telecommunications rack.

5. A telecommunications assembly according to claim 1, wherein the chassis includes a latch slot, the latch slot configured to receive a portion of a flexible latch of the telecommunications module for forming a snap fit interlock with the module for retaining the module within the chassis.

6. A telecommunications assembly according to claim 1, further comprising an optical component mounted to the friction clamp within the housing.

7. A telecommunications assembly according to claim 6, wherein the optical component mounted within the module includes a fiber optic splitter, the fiber optic splitter configured to split a single signal incoming into the module into a plurality of same outgoing signals.

8. A telecommunications assembly according to claim 1, wherein the chassis includes a plurality of the telecommunication modules inserted into the chassis.

9. A telecommunications assembly according to claim 1, wherein the telecommunications module defines an opening for receiving optical fiber cables carrying the fiber optic input signal.

10. A telecommunications assembly according to claim 1, wherein the telecommunications module further comprises a cable exit structure including a bell-shaped portion defining the signal output location, the bell shaped portion configured to provide bend radius protection to optical fiber cables carrying the fiber optic output signal.

11. A telecommunications module comprising:
   a housing defining at least one signal input location and at least one signal output location; and a friction clamp located within the housing for removably mounting an optical component that can receive a fiber optic input signal coming in from the signal input location and output a fiber optic output signal going toward the signal output location, the friction clamp defining a top portion and a bottom portion that are slidably inserted between an upper clamp wall and a lower clamp wall defined within the housing, wherein the upper clamp wall and the lower clamp wall define opposing notches and the top and bottom portions define keying tabs, respectively, for slidable mating with the notches of the upper and lower clamp walls, the friction clamp defining an open end configured to slidably receive the optical component therethrough and fixedly retain the optical component with respect to the housing solely via frictional force from both the top and bottom portions of the friction clamp, wherein the friction clamp is configured such that the optical component is not received within the housing without first contacting the top and bottom portions.

12. A telecommunications module according to claim 11, wherein the signal input location is defined by a connector that protrudes from the housing, the connector configured for mating with a fiber optic adapter.

13. A telecommunications module according to claim 11, wherein a height of the telecommunications module is between 2 and 3 inches and configured to fit within one standard unit (RU) of rack space in a standard telecommunications rack.

14. A telecommunications module according to claim 11, further comprising a flexible latch for mounting to a telecommunications fixture with a snap-fit interlock.

15. A telecommunications module according to claim 11, wherein the module includes a fiber optic splitter within the module, the fiber optic splitter configured to split a single signal incoming into the module into a plurality of same outgoing signals.

\* \* \* \* \*